(12) United States Patent
Miyata

(10) Patent No.: US 9,798,729 B2
(45) Date of Patent: *Oct. 24, 2017

(54) INFORMATION PROCESSING DEVICES THAT MERGE FILES, INFORMATION PROCESSING METHODS FOR MERGING FILES, AND COMPUTER-READABLE MEDIA STORING INSTRUCTIONS THAT INSTRUCT INFORMATION PROCESSING DEVICES TO MERGE FILES

(71) Applicant: Brother Kogyo Kabushiki Kaisha, Nagoya-shi, Aichi-ken (JP)

(72) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 456 days.

This patent is subject to a terminal disclaimer.

(21) Appl. No.: 13/848,003

(22) Filed: Mar. 20, 2013

(65) Prior Publication Data

US 2013/0262526 A1    Oct. 3, 2013

(30) Foreign Application Priority Data

Mar. 30, 2012  (JP) .................. 2012-082555

(51) Int. Cl.
*G06F 7/00* (2006.01)
*G06F 17/30* (2006.01)
*G06F 13/14* (2006.01)

(52) U.S. Cl.
CPC .............. *G06F 17/30115* (2013.01)

(58) Field of Classification Search
CPC ............ G06F 1/1637; G06F 1/1647; G06F 2200/1637; G06F 3/14; G06F 3/1454;
(Continued)

(56) References Cited

U.S. PATENT DOCUMENTS

2005/0204025 A1* 9/2005 Haparnas ............... H04W 4/16
709/223
2008/0144066 A1   6/2008 Ferlitsch
(Continued)

FOREIGN PATENT DOCUMENTS

JP    2008-109644 A    5/2008

OTHER PUBLICATIONS

United States Patent and Trademark Office; First Office Action issued for related co-pending U.S. Appl. No. 13/848,013; dated Sep. 17, 2015.

(Continued)

*Primary Examiner* — Cecile Vo
(74) *Attorney, Agent, or Firm* — Baker Botts L.L.P.

(57) ABSTRACT

Information processing devices include a sensor, a storage device, a communication device, a processor, and a memory. The information processing devices receive a particular file and particular sensor information from a terminal device. The particular sensor information is generated by the terminal device. The information processing devices access certain sensor information generated by the sensor. The information processing devices determine a merge condition based on the particular sensor information and the certain sensor information. The information processing devices merge a certain file stored in the storage device and the particular file based on the merge condition. Some information processing devices transmit certain sensor information to another terminal device. Such information processing devices receive a particular file and a merge condition from the other terminal device. Such information processing devices merge a certain file stored in the storage portion and the particular file based on the merge condition.

17 Claims, 11 Drawing Sheets

(58) Field of Classification Search
CPC .......... G06F 3/0488; G06F 17/30274; G06F 3/04815; G06F 17/30011; G06F 17/30032; G06F 17/30241; G06F 17/30256; G06F 17/30265; G06F 17/30793; G06F 17/30864; G06F 17/3087
USPC .......... 455/41.1, 41.2, 41.3, 39, 556.1, 91; 715/723, 724, 766; 707/E17.008, E17.01, 707/E17.019, E17.098, 749, 758, 827
See application file for complete search history.

(56) References Cited

U.S. PATENT DOCUMENTS

| | | | | |
|---|---|---|---|---|
| 2009/0259193 | A1* | 10/2009 | Chen | A61M 5/3243 604/192 |
| 2009/0259493 | A1* | 10/2009 | Venon | G06F 19/322 705/3 |
| 2010/0130125 | A1* | 5/2010 | Nurmi | H04M 1/7253 455/41.1 |
| 2012/0220221 | A1* | 8/2012 | Moosavi | H04M 1/274516 455/41.1 |
| 2013/0052954 | A1 | 2/2013 | Avadhanam | |
| 2013/0262413 | A1 | 10/2013 | Miyata | |

OTHER PUBLICATIONS

U.S. Patent and Trademark Office, Notice of Allowance issued for U.S. Appl. No. 13/848,013, dated Apr. 28, 2016.

\* cited by examiner

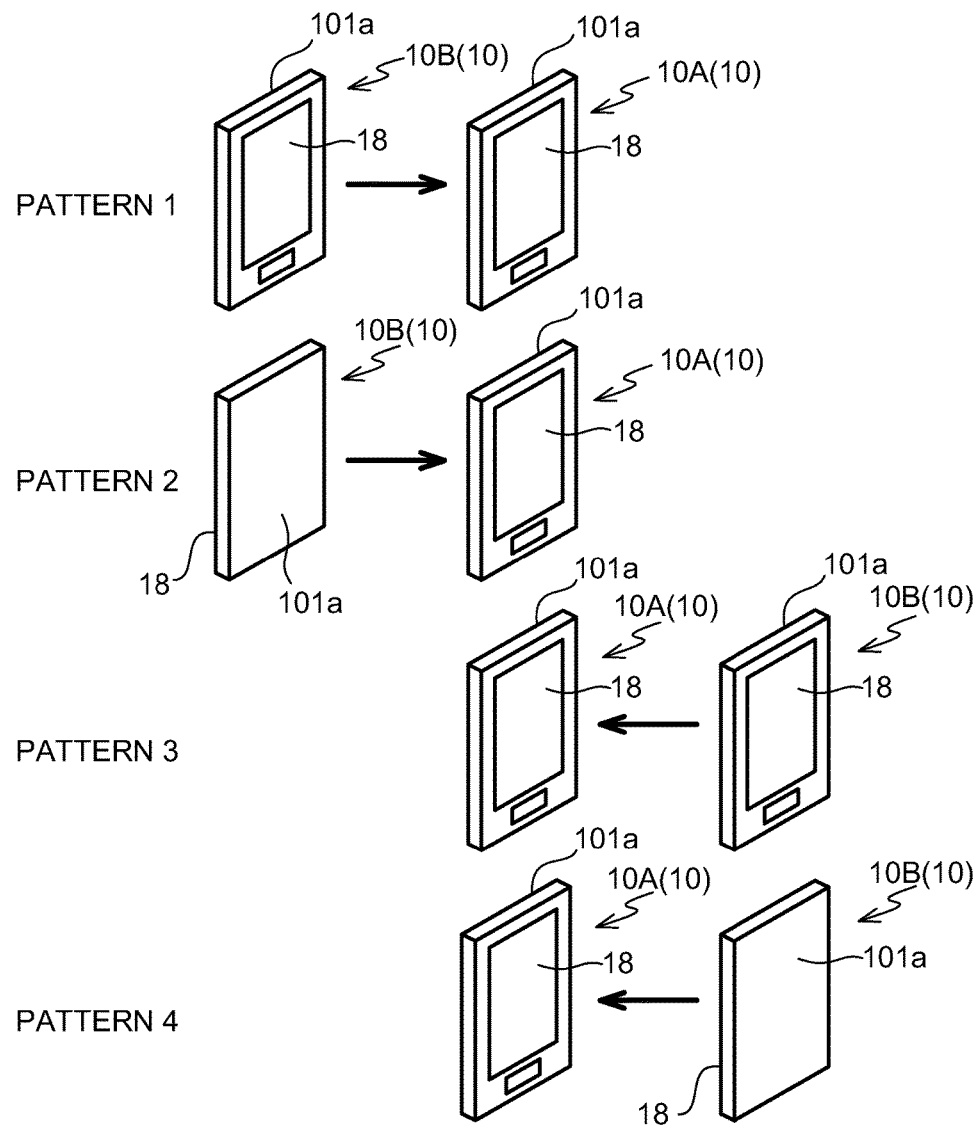

Fig.2B

| PATTERN | FILE MERGE RESULT |
|---|---|
| 1 | A1, A2, ···, An, B1, B2, ···Bn |
| 2 | A1, A2, ···, An, Bn, ···, B2, B1 |
| 3 | B1, B2, ···Bn, A1, A2, ···, An |
| 4 | Bn, ···, B2, B1, A1, A2, ···, An |

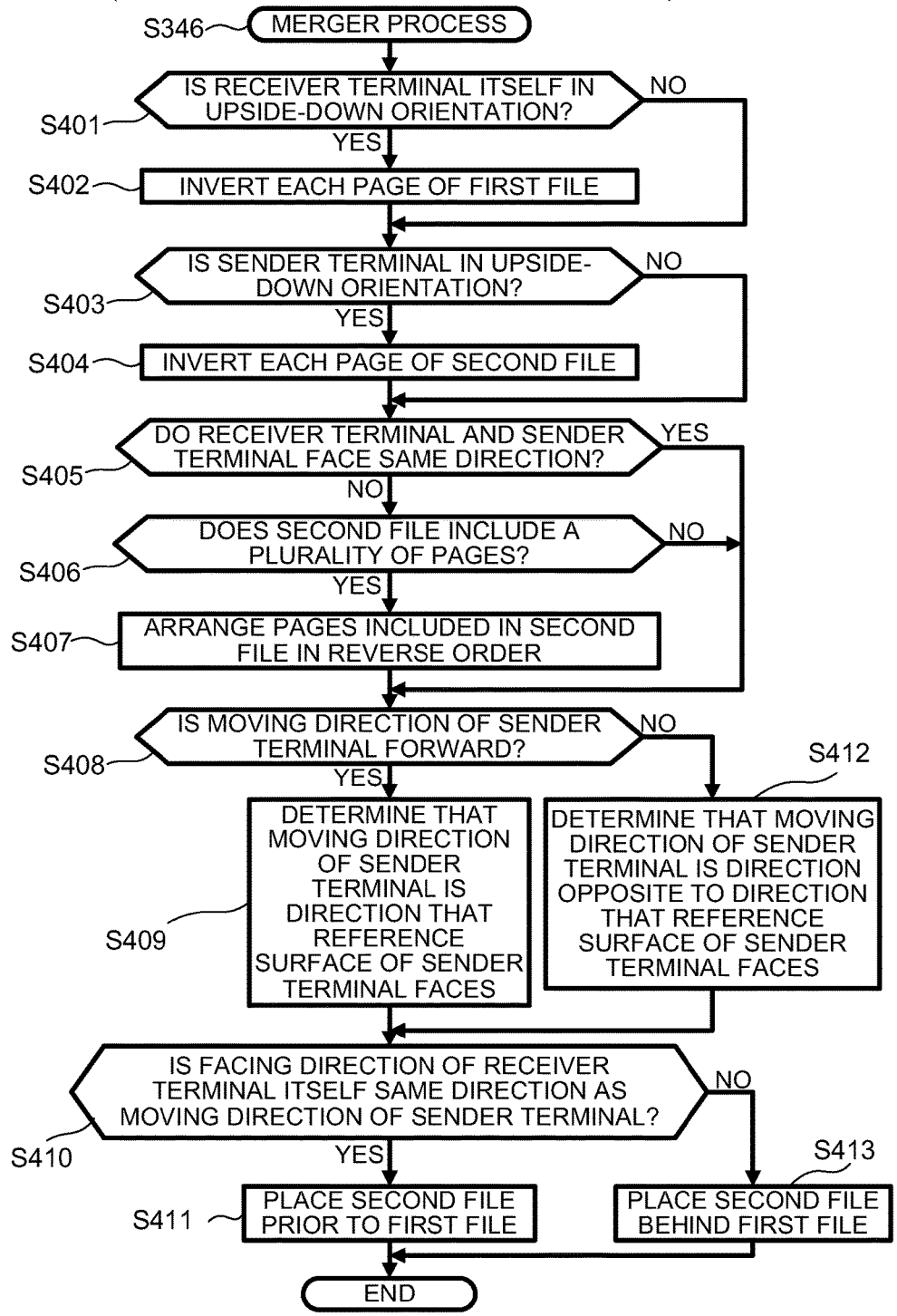
Fig.4 (PROCESS PERFORMED IN MOBILE TERMINAL)

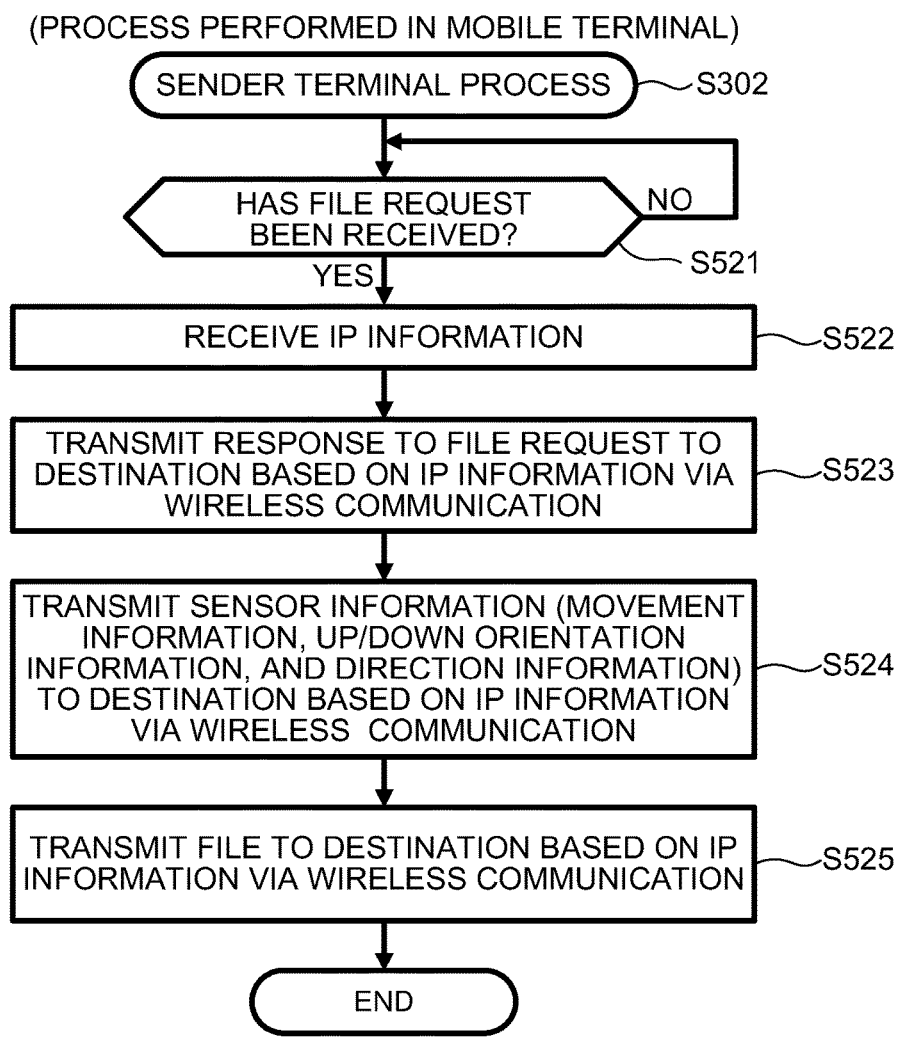

INFORMATION PROCESSING DEVICES THAT MERGE FILES, INFORMATION PROCESSING METHODS FOR MERGING FILES, AND COMPUTER-READABLE MEDIA STORING INSTRUCTIONS THAT INSTRUCT INFORMATION PROCESSING DEVICES TO MERGE FILES

CROSS-REFERENCE TO RELATED APPLICATION

This application claims priority from Japanese Patent Application No. 2012-082555, filed on Mar. 30, 2012, the disclosure of which is incorporated herein by reference.

BACKGROUND OF THE INVENTION

1. Field of the Invention

The disclosure relates generally to information processing and more specifically to information processing devices that merge files, information processing methods for merging files, and computer-readable media storing instructions that instruct information processing devices to merge files.

2. Description of Related Art

A known multifunction peripheral receives a plurality of files and merges the plurality of received files into a single multi-page file.

SUMMARY OF THE INVENTION

A multifunction peripheral may be configured to merge merge-target files into a single file according to a specified file merge order. In particular configurations, the file merge order may be specified by an input signal, which may, for example, be provided to the multifunction peripheral by a user or another device. For example, the file merge order may be specified in advance via input of a particular file merge order through a control panel of the multifunction peripheral. Nevertheless, the specification of the file merge order may be complicated, and thus, a wrong file merge order may be specified.

Accordingly, certain aspects of the disclosure have been developed in view of the problems described above as well as other problems. Configurations disclosed herein may provide for computer-readable storage media storing computer-readable instructions for information processing, methods for information processing, and mobile terminals for information processing. Such information processing may comprise a process for readily merging a plurality of files.

Computer readable media disclosed herein may store computer-readable instructions therein. The computer-readable instructions may instruct an information processing device to perform certain steps when executed by the information processing device. The information processing device may comprise a sensor and a storage device. The instructions may instruct the information processing device to receive a particular file and particular sensor information from a terminal device. The particular sensor information may be generated by the terminal device. The instructions may instruct the information processing device to access certain sensor information. The certain sensor information may be generated by the sensor of the information processing device. The instructions may instruct the information processing device to determine a merge condition based on the particular sensor information and the certain sensor information. The instructions may instruct the information processing device to merge a certain file stored in the storage device and the particular file based on the merge condition.

Computer readable media disclosed herein may store computer-readable instructions therein. The computer-readable instructions may instruct an information processing device to perform certain steps when executed by the information processing device. The information processing device may comprise a sensor and a storage device. The instructions may instruct the information processing device to transmit certain sensor information to a terminal device. The certain sensor information may be generated by the sensor. The instructions may instruct the information processing device to receive a particular file and a merge condition from the terminal device subsequent to transmitting the certain sensor information. The merge condition may be based on the certain sensor information. The instructions may instruct the information processing device to merge a certain file stored in the storage portion and the particular file based on the merge condition.

An information processing device disclosed herein may include a sensor, a storage device, a communication device, a processor, and a memory. The sensor may generate certain sensor information. The storage device may store a certain file. The communication device may communicate with a terminal device. The memory may store computer-readable instructions therein. The computer-readable instructions may instruct an information processing device to perform certain steps when executed by the processor. The computer-readable instructions may instruct the information processing device to receive, via the communication device, a particular file and particular sensor information from the terminal device. The particular sensor information may be generated by the terminal device. The computer-readable instructions may instruct the information processing device to access the certain sensor information. The computer-readable instructions may instruct the information processing device to determine a merge condition based on the particular sensor information and the certain sensor information. The computer-readable instructions may instruct the information processing device to merge the certain file and the particular file based on the merge condition.

An information processing device disclosed herein may include a sensor, a storage device, a communication device, a processor, and a memory. The sensor may generate certain sensor information. The storage device may store a certain file. The communication device may communicate with a terminal device. The memory may store computer-readable instructions therein. The computer-readable instructions may instruct an information processing device to perform certain steps when executed by the processor. The computer-readable instructions may instruct the information processing device to transmit the certain sensor information, via the communication device, to the terminal device. The computer-readable instructions may instruct the information processing device to receive a particular file and a merge condition, via the communication portion, from the terminal device subsequent to the step of transmitting the certain sensor information. The merge condition may be based on the certain sensor information. The computer-readable instructions may instruct the information processing device to merge the certain file and the particular file based on the merge condition.

The aspects of the disclosure may be configured in various manners and as various devices, such as, for example, one or more of an information processing system, an information processing method, and a computer-readable storage medium storing computer-readable instructions for information processing. In certain configurations, an information processing system may comprise, for example, one or more of an information processing device, a mobile terminal, and a control device configured to control the information processing device.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 2A is a schematic diagram showing four approach patterns, wherein one or more of a sender mobile terminal and a receiver mobile terminal is moved toward the other in each approach pattern according to particular configurations.

FIG. 2B shows the results of a file merger process based on each of the four approach pattern according to particular configurations.

FIG. 4 is a flowchart showing an example merger process according to particular configurations.

FIG. 5B is a flowchart showing an example sender terminal process according to certain configurations.

DETAILED DESCRIPTION OF EMBODIMENTS OF THE INVENTION

Figure 1A:
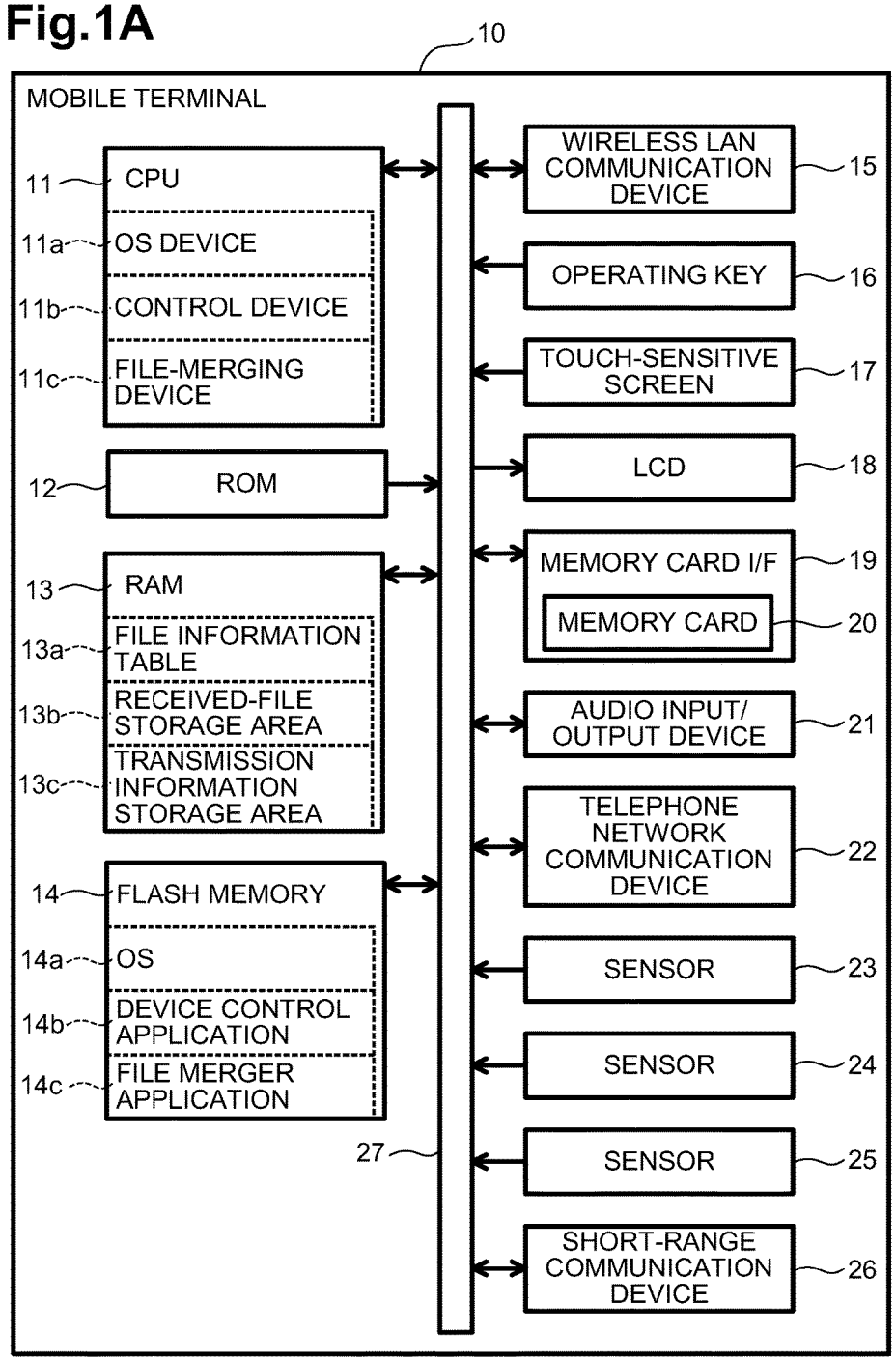
FIG. 1A is a block diagram showing an electrical configuration of a mobile terminal according to particular configurations.

With reference to FIGS. 1A-4, particular configurations according to one or more aspects of the disclosure now are described. FIG. 1A is a block diagram showing an electrical configuration of a mobile terminal 10 on which a file merger application 14c (e.g., computer-readable instructions that instruct a processor to merged files) is installed. The mobile terminal 10 may function as one or more of a receiver, such as, for example, a mobile terminal 10A (hereinafter, also referred to as a "receiver mobile terminal 10A"), and a sender, such as, for example, a mobile terminal 10B (hereinafter, also referred to as a "sender mobile terminal 10B"), in accordance with processing performed by a central processing unit ("CPU") 11 according to the file merger application 14c. In particular configurations, the receiver mobile terminal 10A may be configured to merge a file provided by the receiver mobile terminal 10A itself with a file received from the sender mobile terminal 10B. In particular configurations, the merge-target files may be in the same format. The receiver mobile terminal 10A may be configured to change file merge conditions in accordance with relative facing directions of the receiver mobile terminal 10A and the sender mobile terminal 10B. Therefore, merging the two files using the mobile terminals 10A and 10B may be easy and intuitive.

The mobile terminal 10 may comprise, for example, one or more of the CPU 11, a read-only memory ("ROM") 12, a random-access memory ("RAM") 13, a flash memory 14, a wireless local area network ("LAN") communication device 15, an operation key 16, a touch-sensitive screen 17, a liquid crystal display ("LCD") 18, a memory card interface ("I/F") 19 with a memory card 20 connected thereto, an audio input/output device 21, a telephone network communication device 22, a sensor 23, a sensor 24, a sensor 25, and a short-range communication device 26, each of which may be connected together via a bus 27. The ROM 12, the RAM 13, the flash memory 14, and memory card 20 may be examples of memories and computer-readable storage media. Such computer-readable storage media and memories may further comprise other non-transitory, computer-readable media.

The CPU 11 may be configured to control each device connected to the bus 27 in accordance with fixed values and computer-readable instructions stored in the ROM 12. The ROM 12 may be a non-rewritable nonvolatile memory. The RAM 13 may be a rewritable volatile memory. When the mobile terminal 10 functions as the receiver mobile terminal 10A, a file storage area 13a and a sensor information storage area 13b may be allocated in the RAM 13. A merge-target file provided by the receiver mobile terminal 10A and a merge-target file received from the sender mobile terminal 10B may be stored in the file storage area 13a. Sensor information about the receiver mobile terminal 10A detected by the sensors 23, 24, and 25 of the receiver mobile terminal 10A and sensor information about the sender mobile terminal 10B received from the sender mobile terminal 10B may be stored in the sensor information storage area 13b. The sensor information may comprise, for example, one or more of movement information, up/down orientation information, and direction information. The movement information may represent a direction in which the mobile terminal 10 moves or has moved. The up/down orientation information (e.g., operational orientation information) may represent an up/down orientation (e.g., an operational orientation) of the mobile terminal 10 or a history thereof. The direction information may represent a direction in which the mobile terminal 10 faces or has faced.

The flash memory 14 may be a rewritable nonvolatile memory. The flash memory 14 may be configured to store an operating system ("OS") 14a (e.g., computer-readable instructions for a processor to perform operating functions), a device control application 14b (e.g., computer-readable instructions for a processor to control a device), and a file merger application 14c (e.g., computer-readable instructions for a processor to merged files). In particular configurations, the CPU 11 may execute various computer-readable instructions, such as, for example, one or more of those computer-readable instructions provided in one or more of the applications 14b and 14c and the operating system 14a. Accordingly, CPU 11 may function as, for example, one or more of an OS device, a control device, and a file merging device when executing the computer-readable instructions of the OS 14a, the device control application 14b, and the file merger application 14c, respectively. The OS 14a may comprise computer-readable instructions for implementing standard functions of the mobile terminal 10. In particular configurations, the OS 14a may be, for example, one or more of the Android™ mobile technology platform (Android™ is a trademark owned by Google Inc. of Mountain View, Calif.), the iOS® mobile operating system (iOS® is a registered trademark owned by Cisco Technology, Inc. of San Jose, Calif.), the Windows Mobile® mobile technology platform (Windows Mobile® is a registered trademark of Microsoft Corporation of Redmond, Wash.), and the BlackBerry® communication software (BlackBerry® is a registered trademark of Research In Motion Limited of Ontario, Canada). Nevertheless, the OS 14a is not limited to the above-described systems and may comprise other systems.

The device control application 14b may be supplied by a vendor of a device and installed on the mobile terminal 10. The device control application 14b may enable the mobile terminal 10 to use the device. For example, the device control application 14b may enable the mobile terminal 10 to directly control and use a scanning function of the device without the need for a personal computer.

The file merger application 14c (hereinafter, referred to as "application 14c") may enable the mobile terminal 10 to function as one or more of the receiver mobile terminal 10A and the sender mobile terminal 10B (e.g., a specified role). When the mobile terminal 10 functions as the receiver mobile terminal 10A, the application 14c may instruct the CPU 11 to merge a file provided by the receiver mobile terminal 10A with a file received from a mobile terminal 10B. Accordingly, each process shown in FIGS. 3A-4 may be performed by the CPU 11 in accordance with the application 14c.

The wireless LAN communication device 15 may, for example, be a circuit that may enable the mobile terminal 10 to connect with another device via a Wireless Fidelity ("Wi-Fi®") system (Wi-Fi® is a registered certification mark owned by the Wi-Fi Alliance of Austin, Tex.) using, for example, a wireless LAN that complies with the 802.11b/g standard defined by the Institute of Electrical and Electronics Engineers ("IEEE"). The mobile terminal 10 according to particular configurations may be configured to perform wireless communication with another device (not shown), such as, for example, a scanner or another mobile terminal 10, in an infrastructure mode, via an access point (not shown) that may be a relay station.

The operation key 16 may be a mechanical key that may permit instructions to be input into the mobile terminal 10. For example, the operation key 16 may be disposed on a housing 101 of the mobile terminal 10. A merge-target file may be specified by operating the operation key 16. The touch-sensitive screen 17 may be disposed over or integrally with the LCD 18 and may allow setting information and instructions to be input into the mobile terminal 10. The LCD 18 may be configured to display various images thereon. A nonvolatile memory card 20 may be attached to the memory card I/F 19. The memory card I/F 19 may be configured to control the reading and writing of data from and to the memory card 20. For example, the memory card 20 may be configured to store a file generated from scanned data obtained from a device (not shown). The audio input/output device 21 may be a device for audio input/output and may comprise, for example, one or more of a microphone and a speaker. The telephone network communication device 22 may be a circuit that may permit a telephone call to be placed via cellular networks (not shown).

The sensor 23 may be configured to detect a moving direction of the mobile terminal 10 as the movement information. The sensor 23 may be, for example, an acceleration sensor, such as a three-axis acceleration sensor. When the sensor 23 is a three-axis acceleration sensor, for example, the sensor 23 may sense acceleration in three axial directions (e.g., along X, Y, and Z axes) to detect a moving direction of the mobile terminal 10. The three-axis acceleration sensor may comprise, for example, one or more of a piezo-resistance type three-axis acceleration sensor, a capacitance-type three-axis acceleration sensor, and a heat-sensing type three-axis acceleration sensor. Nevertheless, the sensor 23 may not be limited to the three-axis acceleration sensor but rather may be one or more of a speed sensor or another type sensor that may detect a moving direction of the mobile terminal 10.

The sensor 24 may be configured to detect an up/down orientation of the mobile terminal 10 (described in more detail below) as the up/down orientation information. In particular configurations, the up/down orientation of the mobile terminal 10 may be defined with respect to a direction of gravity (e.g., a normal orientation with respect to the direction of gravity and an upside-down orientation with respect to the direction of gravity, which is substantially opposite the normal orientation). The up-down orientation of each mobile terminal 10 may be determined independently. The sensor 24 may be, for example, a gyro sensor. When the sensor 24 is a gyro sensor, the sensor 24 may detect angular velocity of the mobile terminal 10 to detect the up/down orientation of the mobile terminal 10. In some configurations, the sensor 24 may be a sensor other than a gyro sensor. As disclosed herein, and with reference to the mobile terminal 10 shown in FIG. 1C, a "substantially normal orientation" may be an orientation in which a side of the mobile terminal 10 comprising operation key 16 is furthest downstream in a direction of gravity among the sides of the mobile terminal 10.

In some configurations, the sensor 24 may also be able to detect a sideways orientation of the mobile terminal 10 (e.g., whether mobile terminal 10 is in a substantially sideways orientation). For example, the sideways orientation of mobile terminal 10 may also be defined with respect to a direction of gravity. As disclosed herein, and with reference to the mobile terminal 10 shown in FIG. 1C, a "substantially sideways orientation" may be an orientation in which a side of the mobile terminal 10 comprising operation key 16 is rotated from a normal orientation, with respect to gravity, by a two-dimensional rotation greater than 45 degrees and less than 135 degrees.

The sensor 25 may be configured to detect a direction that the mobile terminal 10 faces as the direction information. The sensor 25 may be, for example, a direction sensor. When the sensor 25 is a direction sensor, the sensor 25 may detect a facing direction (described in more detail below, with reference to the drawings) of a surface of the mobile terminal 10 that may be disposed in a substantially vertical position. The direction sensor may comprise, for example, a micro magnetic sensor using the Magneto-Impedance ("MI") effect of a magnetic substance having soft magnetic properties, such as an MI sensor. In some configurations, the sensor 25 may, for example, be a sensor other than an MI sensor.

The short-range communication device 26 may comprise a circuit configured to perform short-range communication with another device. Such short-range communication may have a short communicable range, such as, for example, approximately 10 cm. A contactless communication system, such as a system based on Near Field Communication ("NFC") standards, may be adopted for the short-range communication. The mobile terminal 10 may be configured to perform short-range communication with another mobile terminal 10. When executed by a CPU 11, the application 14c may implement the transmission and reception of a file between two mobile terminals 10 (e.g., between the mobile terminals 10A and 10B) via short-range communication. Thus, when a distance between the two mobile terminals 10 (e.g., the mobile terminals 10A and 10B) becomes less than or equal to a communicable distance, mobile terminals 10A and 10B may perform the file transmission and reception via short-range communication.

Figure 1B:
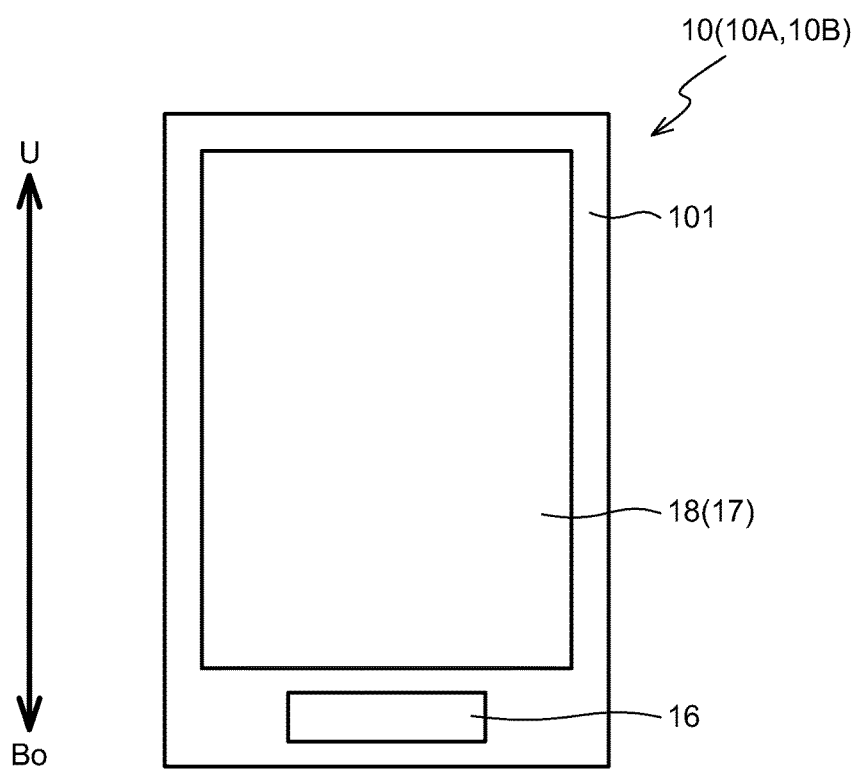
FIG. 1B is a front view showing the mobile terminal according to particular configurations.

FIG. 1B is a front view showing the mobile terminal 10. As shown in FIG. 1B, the mobile terminal 10 may comprise a substantially box-shaped housing 101. The housing 101 may comprise, for example, one or more of the touch-sensitive screen 17, the liquid crystal display ("LCD") 18, and the operation key 16 on one surface thereof. The LCD 18, which may incorporate, overlay, or underlay the touch-sensitive screen 17, and the operation key 16 may be disposed side by side along a longitudinal direction of the housing 101 (e.g., an up or down direction in FIG. 1B that is indicated by a double-ended arrow). In particular configurations, the up/down orientation of the mobile terminal 10 may be defined with respect to the direction of gravity. A normal orientation of the mobile terminal 10 may be an orientation in which the mobile terminal 10 is intended to be used normally. The mobile terminal 10 may be used normally while the LCD 18 is situated at an upper portion of the mobile terminal 10 and the operation key 16 may be situated at a lower portion of the mobile terminal 10, as shown in FIG. 1B. Therefore, the mobile terminal 10 shown in FIG. 1B may be in the normal orientation because, in FIG. 1B, the LCD 18 is situated at the upper portion of the mobile terminal 10 (e.g., an upper side to which an arrow U may point) and the operation key 16 is situated at the lower portion of the mobile terminal 10 (e.g., a lower side to which an arrow Bo may point). An upside-down orientation of the mobile terminal 10 may be an orientation in which the mobile terminal 10 shown in FIG. 1B is rotated by a half-turn (e.g., substantially 180 degrees) about an axis normal to the surface of the LCD 18. In the upside-down orientation, the LCD 18 may be situated at the lower portion of the mobile terminal 10 (e.g., a lower side to which the arrow Bo may point) and the operation key 16 may be situated at the upper portion of the mobile terminal 10 (e.g., an upper side to which the arrow U may point). The sensor 24 may be configured to detect the up/down orientation of the mobile terminal 10 regardless of whether the mobile terminal 10 is in the normal orientation or in the upside-down orientation. In particular configurations, the application 14c may be configured to change an up/down orientation of one or more pages comprised in each merge-target file in accordance with the up/down orientation of each of a receiver mobile terminal 10 and a sender mobile terminal 10.

Figure 1C:
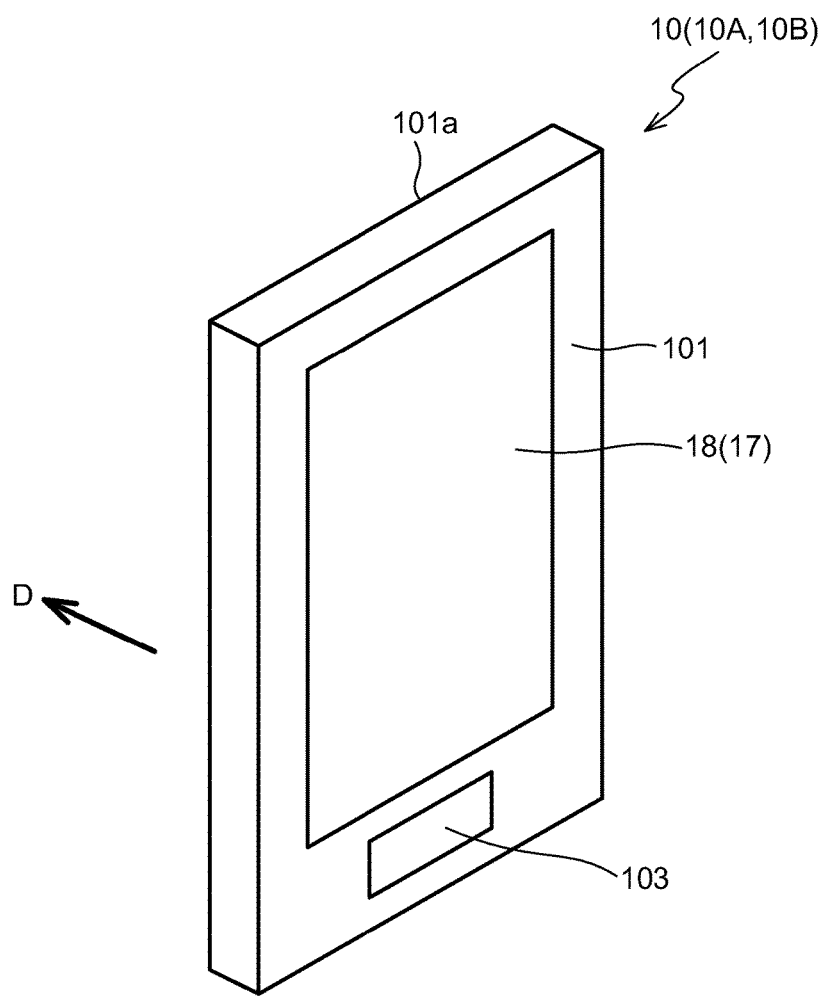
FIG. 1C is a perspective view showing the mobile terminal according to particular configurations.

FIG. 1C is a perspective view showing the mobile terminal 10. As shown in FIG. 1C, the mobile terminal 10 may comprise a rear surface 101a that may be opposite to the surface on which the LCD 18 is disposed (the surface on which the LCD 18 is disposed in FIG. 1C, hereinafter, also referred to as a "reference surface"). The sensor 25 may be configured to detect a direction of a vector normal to the reference surface and extending toward the rear surface 101a from the reference surface (e.g., a direction of an arrow D in FIG. 1C) that may correspond to the facing direction of the mobile terminal 10.

FIG. 2A shows various approach patterns in which one or more of the sender mobile terminal 10B and the receiver mobile terminal 10A is moved toward the other. There may be at least four such approach patterns (e.g., patterns 1, 2, 3, and 4 shown in FIG. 2A). An approach pattern in which the reference surface of the sender mobile terminal 10B faces the rear surface 101a of the receiver mobile terminal 10A may be referred to as pattern 1. An approach pattern in which the rear surface 101a of the sender mobile terminal 10B faces the rear surface 101a of the receiver mobile terminal 10A may be referred to as pattern 2. An approach pattern in which the rear surface 101a of the sender mobile terminal 10B faces the reference surface of the receiver mobile terminal 10A may be referred to as pattern 3. An approach pattern in which the reference surface of the sender mobile terminal 10B faces the reference surface of the receiver mobile terminal 10A may be referred to as pattern 4. In particular configurations, the application 14c may be configured to provide different file merge results in accordance with the approach pattern of the two mobile terminals 10.

FIG. 2B shows file merger results corresponding to each approach pattern shown in FIG. 2A. In FIG. 2B, an original file provided by the receiver mobile terminal 10A may comprise data of n pages comprising pages A1 to An and an original page order of the pages A1 to An in the original file may be "A1, A2, . . . , An." An original file provided by the sender mobile terminal 10B may comprise data of m pages comprising B1 to Bm and an original page order of the pages B1 to Bm in the original file may be "B1, B2, . . . , Bm."

As shown in FIG. 2B, a merge result of pattern 1 may result in a file having pages A1 to An and B1 to Bm and a page order of "A1, A2, . . . , An, B1, B2, . . . , Bm." A merge result of pattern 2 may result in a file having pages A1 to An and B1 to Bm and a page order of "A1, A2, . . . , An, Bm, . . . , B2, B1." Consequently, the file order of the files provided by the mobile terminals 10A, 10B, respectively, in pattern 2, may be the same as the file order in the marge result of pattern 1; however, the merged page order of the pages comprised in the file provided by the sender mobile terminal 10B may be the reverse of the original page order.

A merge result of pattern 3 may result in a file having pages A1 to An and B1 to Bm and a page order of "B1, B2, . . . , Bm, A1, A2, . . . , An." Consequently, the file order of the files provided by the mobile terminals 10A, 10B, respectively, in pattern 3, may be the reverse of the file order in the marge result of pattern 1. A merge result of pattern 4 may result in a file having pages A1 to An and B1 to Bm and a page order of "Bm, . . . , B2, B1, A1, A2, . . . , An." Consequently, the file order of the files provided by the mobile terminals 10A, 10B, respectively, in pattern 3, may be the same as the file order in the marge result of pattern 1, however, the merged page order of the pages comprised in the file provided by the sender mobile terminal 10B may be the reverse of the original page order.

The mobile terminal 10 may function similarly to a physical file comprising one or more pages, in which the reference surface (e.g., the surface on which the LCD 18 may be disposed) may correspond to a first page of the file and the rear surface 101a of the mobile terminal 10 correspond to an $n^{th}$ or $m^{th}$ page (e.g., a last page) of the file. As shown in patterns 1 and 2 of FIG. 2A, the rear surface 101a of the receiver mobile terminal 10A may be oriented closer to the sender mobile terminal 10B than the reference surface of the receiver mobile terminal 10A. Consequently, if the file stored in the receiver mobile terminal 10A represented a first physical file and the file stored in the sender mobile terminal 10B represented a second physical file, for example, the patterns 1 and 2 may represent an arrangement in which the second physical file is arranged behind the first physical file. As shown in patterns 3 and 4 of FIG. 2A, the reference surface of the receiver mobile terminal 10A may be oriented closer to the sender mobile terminal 10B than the rear surface 101a of the receiver mobile terminal 10A. Consequently, the patterns 3 and 4 may represent an arrangement in which the second physical file is arranged in front of the first physical file. As described above, the application 14c may be configured to arrange the file order of the marge-target files in accordance with the location of the sender mobile terminal 10B (e.g., based on whether the sender mobile terminal 10B is closer to the reference surface of the receiver mobile terminal 10A or the rear surface 101a of the receiver mobile terminal 10A). Accordingly, particular configurations disclosed herein may offer an intuitive file merge of the two files.

In furtherance to the example in which the file stored in the receiver mobile terminal 10A may represent a first physical file and the file stored in the sender mobile terminal 10B may represent a second physical file, the reference surface of each of the mobile terminals 10A and 10B may correspond to a first page of the first and second physical files, respectively, and the rear surface 101a of each of the receiver mobile terminal 10A and 10B may correspond to an $n^{th}$ page of the first physical file and an $m^{th}$ page of the second physical file (e.g., last pages), respectively. In patterns 1 and 3, the reference surface of one of mobile terminals 10A and 10B may face the rear surface 101a of the other of mobile terminals 10A and 10B. Consequently, the patterns 1 and 3 may represent an arrangement in which the page order of the pages comprised in the first physical file and the page order of the pages comprised in the second physical file remain the same as their respective original page orders subsequent to the files being merged. In patterns 2 and 4, the rear surface 101a of the receiver mobile terminal 10A may face the rear surface 101a of the sender mobile terminal 10B or the reference surface of the receiver mobile terminal 10A may face the reference surface of the sender mobile terminal 10B, respectively. Consequently, the patterns 2 and 4 may represent an arrangement in which the page order of the pages comprised in the first physical file may be the original page order of the pages in the first physical file and the page order of the pages comprised in the second physical file may be the reverse of the original page order of the pages comprised in the second physical file subsequent to the files being merged. As described above, the application 14c may be configured to arrange the page order of the file from the sender mobile terminal 10B in accordance with the relative facing directions of the receiver mobile terminal 10A and the sender mobile terminal 10B. Accordingly, particular configurations may offer an intuitive file merge of the two files.

Figure 3A:
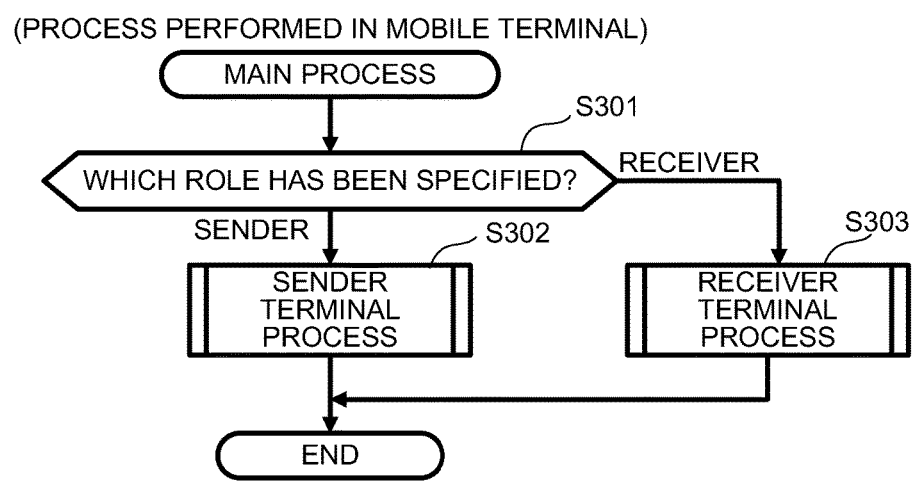
FIG. 3A is a flowchart showing an example main process according to particular configurations.

FIG. 3A is a flowchart showing an example main process performed by the CPU 11 of the mobile terminal 10 in accordance with the application 14c. The main process may be started as the application 14c starts. In S301, the CPU 11 may determine whether the mobile terminal 10 has been specified as one of the receiver mobile terminal 10A and the sender mobile terminal 10B (S301). In particular configurations, the application 14c may permit CPU 11 to receive an input command that specifies mobile terminal 10 to be one of the receiver mobile terminal 10A and the sender mobile terminal 10B (e.g., selecting a role for the mobile terminal 10 as either a receiver mobile terminal 10A or a sender mobile terminal 10B). The input command may be received through a main screen (not shown) displayed on the LCD 18. In particular configurations, the touch-sensitive screen 17 may receive the input command, and the CPU 11 may accept the input command and subsequently perform the determination in S301 based on the accepted input command. Further, the CPU 11 may accept another input command corresponding to a selection of a merge-target file, as well as the input command selecting a role for the mobile terminal 10. More specifically, the merge-target file selection may be performed as described below. The CPU 11 may display a list of file names of files stored in the memory card 20 on the LCD 18. Then, when the CPU 11 detects the other input command corresponding to the selection of one of the file names through the touch-sensitive screen 17, the CPU 11 may accept the selection of the file corresponding to the selected file name.

In S301, in response to the CPU 11 determining that the role of the mobile terminal 10 is specified as the sender mobile terminal 10B (SENDER in S301), the CPU 11 of the mobile terminal 10 may perform a sender terminal process for controlling the mobile terminal 10 to function as the sender mobile terminal 10B (S302). Subsequently, the CPU 11 may end the main process. In response to the CPU 11 determining that the role of the mobile terminal 10 is specified as the receiver mobile terminal 10A (RECEIVER in S301), the CPU 11 of the mobile terminal 10 may perform a receiver terminal process for controlling the mobile terminal 10 to function as the receiver mobile terminal 10A (S303). Subsequently, CPU 11 may end the main process.

Figure 3B:
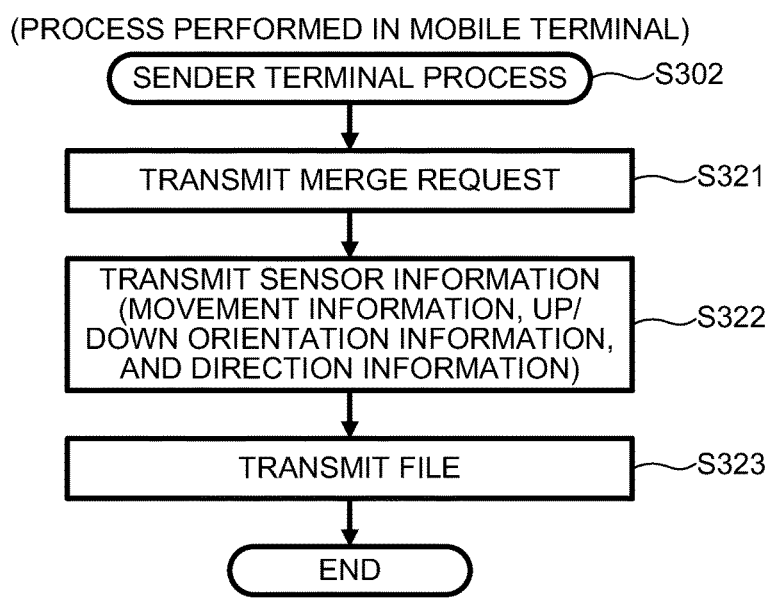
FIG. 3B is a flowchart showing an example sender terminal process according to particular configurations.

With reference to FIG. 3B, the sender mobile terminal process (S302) now is described. In S321, the CPU 11 of the sender mobile terminal 10B may transmit a merge request to the receiver mobile terminal 10A via the short-range communication device 26 (S321). In S322, the CPU 11 of the sender mobile terminal 10B may transmit the sensor information detected by the sensors 23, 24, and 25, via the short-range communication device 26, to the receiver mobile terminal 10A as the sensor information of the sender mobile terminal 10B (S322). In S323, the CPU 11 of the sender mobile terminal 10B may transmit a merge-target file, which is specified by the other input command, from the memory card 20 to the receiver mobile terminal 10A via the short-range communication device 26 (S323). Subsequently, CPU 11 of the sender mobile terminal 10B may end the sender mobile terminal process. In some configurations, the sender mobile terminal 10B may be moved closer to the receiver mobile terminal 10A subsequent to receiving the input command selecting the role of the mobile terminal 10 through the main screen (not shown) of the application 14c. Thus, the sender mobile terminal 10B may transmit the merge request, the sensor information, and the file in this order through short-range communication, via the short-range communication device 26, to the receiver mobile terminal 10A when the distance between the mobile terminals 10A and 10B becomes less than or equal to the communicable distance.

Figure 3C:
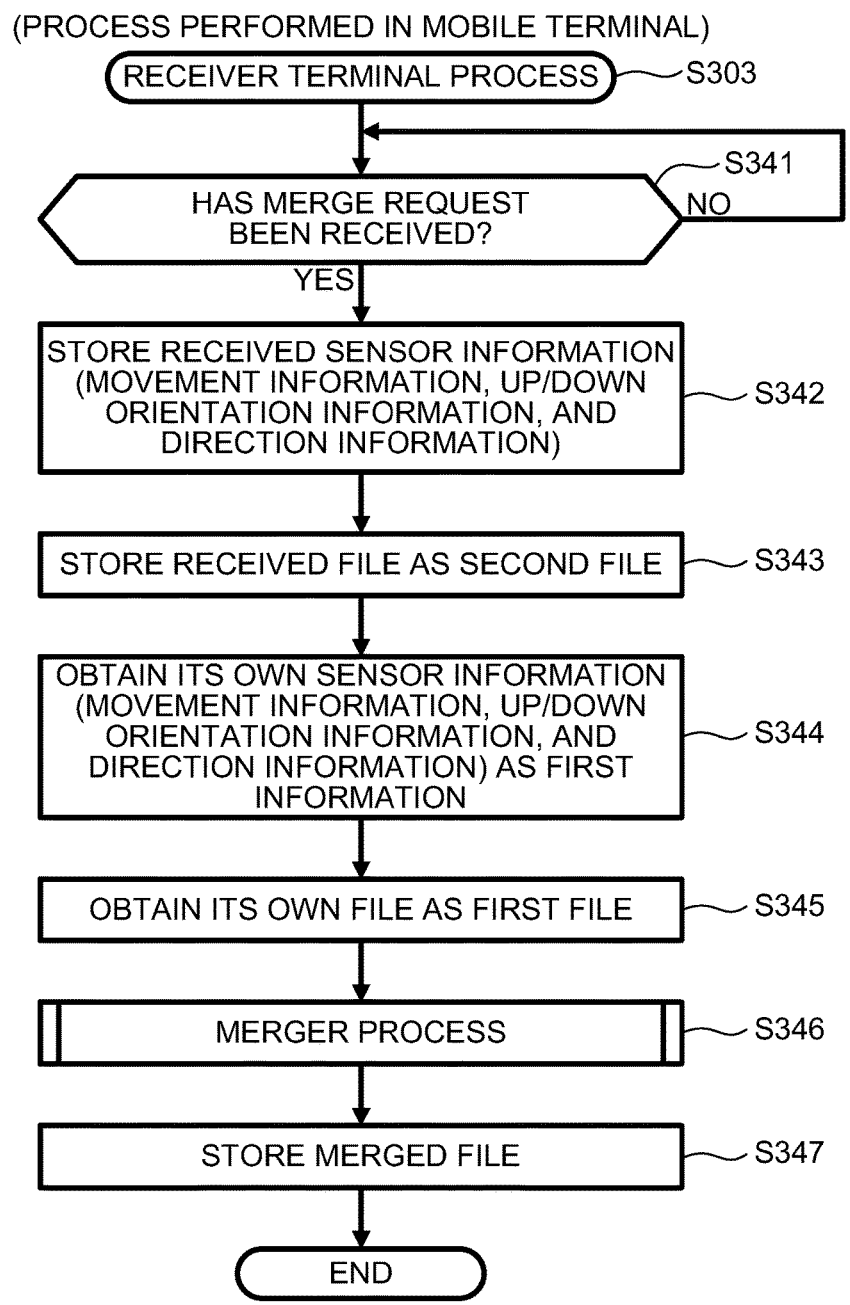
FIG. 3C is a flowchart showing an example receiver terminal process according to particular configurations.

With reference to FIG. 3C, the receiver mobile terminal process (S303) now is described. In S341, the CPU 11 of the receiver mobile terminal 10A may determine whether the receiver mobile terminal 10A has received a merge request from the sender mobile terminal 10B. When the receiver mobile terminal 10A has not received a merge request from the sender mobile terminal 10B via short-range communication device 26 (NO in S341), the CPU 11 of the receiver mobile terminal 10A may repeat the determination in S341 until the receiver mobile terminal 10A receives a merge request via the short-range communication device 26. In S341, when the CPU 11 of the receiver mobile terminal 10A determines that the receiver mobile terminal 10A has received a merge request via the short-range communication device 26 (YES in S341), the CPU 11 of the receiver mobile terminal 10A may proceed to S342 and store the sensor information from the sender mobile terminal 10B received via the short-range communication device 26 in the sensor information storage area 13b as particular sensor information (S342). In S343, the CPU 11 of the receiver mobile terminal 10A may store the file received via the short-range communication device 26 (e.g., the file transmitted from sender the sender mobile terminal 10B) in the file storage area 13a, as a particular file (S343).

Subsequently, the CPU 11 of the receiver mobile terminal 10A may obtain sensor information detected by the sensors 23, 24, and 25 of the receiver mobile terminal 10A, as its own sensor information (e.g., sensor information about the receiver mobile terminal 10A), and store the sensor information as certain sensor information in the sensor information storage area 13b (S344). Thus, the sensor information detected by the sensors 23, 24, and 25 of the receiver mobile terminal 10A at the time the receiver mobile terminal 10A receives the merge request from the sender mobile terminal 10B may be stored in the sensor information storage area 13b, as certain sensor information. In S345, the CPU 11 of the receiver mobile terminal 10A may obtain the file specified as a merge target by the other input command from the memory card 20, as a certain file (S345). The CPU 11 of the receiver mobile terminal 10A may store the certain file obtained in S345 in the file storage area 13a. In S346, the CPU 11 of the receiver mobile terminal 10A may perform a merger process in which the certain and particular files stored in the file storage area 13a may be merged (S346). Details of the merger process (S346) are further described below with reference to FIG. 4. Subsequent to performing the merger process of S346, the CPU 11 of the receiver mobile terminal 10A may store the merged file in the memory card 20 (S347). Thereafter, CPU 11 of the receiver mobile terminal 10A may end the merger process.

With reference to FIG. 4, the merger process (S346) now is described. In S401, the CPU 11 of the receiver mobile terminal 10A may determine, based on the certain sensor information stored in the sensor information storage area 13b, whether the receiver mobile terminal 10A is in the upside-down orientation (S401). More specifically, the CPU 11 of the receiver mobile terminal 10A may make the determination in S401 based on the up/down orientation of the receiver mobile terminal 10A indicated by the up/down orientation information stored in the certain sensor information. When the CPU 11 of the receiver mobile terminal 10A determines that the receiver mobile terminal 10A is in the upside-down orientation (YES in S401), the CPU 11 may invert each page of the certain file stored in the file storage area 13a to the upside-down orientation (S402), and the routine may move to S403. When the CPU 11 of the receiver mobile terminal 10A determines that the receiver mobile terminal 10A is in the normal orientation (NO in S401), the CPU 11 may omit S402 and subsequently move to S403. Thus, when the up/down orientation information of the certain sensor information indicates that the receiver mobile terminal 10A is in the upside-down orientation, the up/down orientation of each page of the certain file provided by the receiver mobile terminal 10A may be inverted to the upside-down orientation.

In S403, the CPU 11 of the receiver mobile terminal 10A may determine, based on the particular sensor information stored in the sensor information storage area 13b, whether the sender mobile terminal 10B is in the upside-down orientation (S403). More specifically, the CPU 11 of the receiver mobile terminal 10A may make the determination in S403 based on the up/down orientation of the sender mobile terminal 10B indicated by the up/down orientation information of the particular sensor information. When the CPU 11 of the receiver mobile terminal 10A determines that the sender mobile terminal 10B is in the upside-down orientation (YES in S403), the CPU 11 may invert each page of the particular file stored in the file storage area 13a to the upside-down orientation (S404), and the routine may subsequently move to S405. When the CPU 11 of the receiver mobile terminal 10A determines that the sender mobile terminal 10B is in the normal orientation (NO in S403), the CPU 11 may omit S404 and subsequently move to S405. Thus, when the up/down orientation information of the particular sensor information indicates that the sender mobile terminal 10B is in the upside-down orientation, the up/down orientation of each page of the particular file provided by the sender mobile terminal 10B may be inverted to the upside-down orientation.

In S405, the CPU 11 of the receiver mobile terminal 10A may determine, based on the certain and particular sensor information stored in the sensor information storage area 13b, whether the receiver mobile terminal 10A and the sender mobile terminal 10B face the same direction (S405). More specifically, the CPU 11 of the receiver mobile terminal 10A may make the determination in S405 based on the facing direction of the receiver mobile terminal 10A indicated by the direction information of the certain sensor information and the facing direction of the sender mobile terminal 10B indicated by the direction information of the particular sensor information. When the CPU 11 of the receiver mobile terminal 10A determines that the receiver mobile terminal 10A and the sender mobile terminal 10B face different directions (e.g., substantially opposite directions) from each other (NO in S405), the CPU 11 subsequently may move to S406 and determine whether the particular file may comprise a plurality pages (S406). When the CPU 11 of the receiver mobile terminal 10A determines that the particular file comprises a plurality of pages (YES in S406), the CPU 11 may arrange the pages comprised in the particular file in the reverse order (e.g., in descending order) (S407), and the CPU 11 subsequently may move to S408. Therefore, when the approach pattern of the mobile terminals 10A and 10B is one of pattern 2 and pattern 4, the page order of the pages comprised in the particular file may be reversed when a plurality of pages exist in the particular file. When the particular file consists of only one page (NO in S406), although the CPU 11 of the receiver mobile terminal 10A may determine that the receiver mobile terminal 10A and the sender mobile terminal 10B face different directions from each other (NO in S405), to the CPU 11 may omit S407 (e.g., changing the page order of the page comprised in the particular file) because there are no additional pages to order. Consequently, the CPU 11 subsequently may move to S408.

When the CPU 11 of the receiver mobile terminal 10A determines that the receiver mobile terminal 10A and the sender mobile terminal 10B face the same direction (e.g., substantially the same direction) (YES in S405), the CPU 11 may omit S407, and the CPU 11 subsequently may move to S408. Thus, when the approach pattern of the mobile terminals 10A and 10B is one of pattern 1 and pattern 3, the page order of the one or more pages comprised in the particular file may not be changed. Conversely, when the direction information of the certain sensor information and the direction information of the particular sensor information indicate that the receiver mobile terminal 10A and the sender mobile terminal 10B face different directions from each other (e.g., the reference surfaces of the mobile terminals 10A and 10B face different directions from each other, such as in approach patterns 2 and 4 described above), the page order of the plurality of pages comprised in the particular file may be reversed.

As disclosed herein, a first direction may be "substantially the same as" a second direction when an angle from the first direction to the second direction is greater than or equal to 0 degrees and less than 90 degrees or greater than 270 degrees and less than 360 degrees. As disclosed herein, a first direction may be "substantially opposite to" a second direction when an angle from the first direction to the second direction is greater than 90 degrees and less than 270 degrees.

In S408, the CPU 11 of the receiver mobile terminal 10A may determine, based on the particular sensor information stored in the sensor information storage area 13b, whether the sender mobile terminal 10B is moving forward (S408). More specifically, the CPU 11 of the receiver mobile terminal 10A may make the determination in S408 based on the moving direction of the sender mobile terminal 10B indicated by the movement information in the particular sensor information. In particular configurations, a side comprising the reference surface of the sender mobile terminal 10B may be a front of the sender mobile terminal 10B, and a side comprising the rear surface 101a of the sender mobile terminal 10B may be a rear of the sender mobile terminal 10B. For example, when the sender mobile terminal 10B moves in a positive direction with respect to an axis normal to the front and the rear of the sender mobile terminal 10B (e.g., an X-axis with a positive direction being a direction pointing from the rear to the front), this movement may be determined as forward movement. Accordingly, when the movement information of the particular sensor information represents that the sender mobile terminal 10B moves in the positive direction along the axis defined from the rear to the front of the sender mobile terminal 10B, the CPU 11 of the receiver mobile terminal 10A may determine that the moving direction is forward.

When the CPU 11 of the receiver mobile terminal 10A determines that the moving direction of the sender mobile terminal 10B is forward (YES in S408), the CPU 11 may determine that the moving direction of the sender mobile terminal 10B is a facing direction of the reference surface of the sender mobile terminal 10B (S409). Therefore, when the approach pattern of the mobile terminals 10A and 10B is one of pattern 1 and pattern 4, the moving direction of the sender mobile terminal 10B may be determined as the facing direction of the reference surface of the sender mobile terminal 10B. When the CPU 11 of the receiver mobile terminal 10A determines that the moving direction of the sender mobile terminal 10B is not forward (e.g., the moving direction is rearward) (NO in S408), the CPU 11 of the receiver mobile terminal 10A may determine that the moving direction of the sender mobile terminal 10B is a direction opposite to the facing direction of the reference surface of the sender mobile terminal 10B (S412). Thus, the approach pattern of the mobile terminals 10A and 10B is one of pattern 2 and pattern 3, and the moving direction of the sender mobile terminal 10B may be determined as the direction opposite to the facing direction of the reference surface of the sender mobile terminal 10B.

Subsequently, the CPU 11 of the receiver mobile terminal 10A may determine whether the facing direction of the receiver mobile terminal 10A represented by the direction information in the certain sensor information is the same direction as the moving direction of the sender mobile terminal 10B determined in one of S409 and S412 (S410). In S410, when the CPU 11 of the receiver mobile terminal 10A determines that the facing direction of the receiver mobile terminal 10A is the same direction as the moving direction of the sender mobile terminal 10B (YES in S410), the reference surface of the receiver mobile terminal 10A may be arranged closer to the sender mobile terminal 10B than the rear surface 101a of the receiver mobile terminal 10A. In this case, the CPU 11 of the receiver mobile terminal 10A may place the particular file in a merged file prior to the certain file (S411), such that the pages of the particular file are in front of the pages of the certain file in the merged file, and the CPU 11 subsequently may end the merger process. Therefore, when the approach pattern of the mobile terminals 10A and 10B is one of pattern 3 and pattern 4, the particular file may be placed prior to the certain file in the merged file. In some configurations, the merged file may be one of the certain file and the particular file. In other configurations, the merged file may be a different file, such as, for example, a newly generated file.

When the CPU 11 of the receiver mobile terminal 10A determines that the facing direction of the receiver mobile terminal 10A is a direction different from the moving direction of the sender mobile terminal 10B (NO in S410), which may indicate that the rear surface 101a of the receiver mobile terminal 10A is arranged closer to the sender mobile terminal 10B than the reference surface of the receiver mobile terminal 10A. Thus, the CPU 11 of the receiver mobile terminal 10A may place the particular file in the merged file behind the certain file (S413), such that the pages of the particular file are behind the pages of the certain file in the merged file, and the CPU 11 subsequently may end the merger process. Therefore, when the approach pattern of the mobile terminals 10A and 10B is one of pattern 1 and pattern 2, the particular file may be placed behind the certain file.

According to above-described configurations, once the two mobile terminals 10 (e.g., the mobile terminals 10A and 10B) move closer to each other, such that a distance therebetween is less than or equal to the communicable distance of the short-range communication, the files provided by the respective mobile terminals 10A and 10B may be readily merged into a single file (e.g., a merged file). Therefore, for example, a scanning operation of voluminous documents may be readily completed in the following manner. First, voluminous documents may be divided into two groups and the two groups may be scanned separately by two different devices. Subsequently, the device control application 14b may be started on two mobile terminals 10, each of the two mobile terminals 10 comprising data from a different one of the scanned two groups. The mobile terminals 10 may move closer to each other, and the merge process may be performed to merge the scanned data of the respective mobile terminals 10 into combined data. By doing so, the scanning operation of voluminous documents may be readily completed. Particularly, the file merge conditions (e.g., one or more of the file order, the page order of a received file, and the up/down orientation of pages of each file) may be determined in accordance with the facing direction, the up/down orientation, and the moving direction detected by the respective sensors 23, 24, and 25 of each of the mobile terminals 10A and 10B. Therefore, it may not be necessary to set the file merge conditions in advance or to modify the merged file appropriately subsequent to merging. Thus, particular configurations may offer convenience. Further, the file merge conditions may be determined based on the up/down orientation, facing direction, and moving direction of each mobile terminal 10. Therefore, the merging of the two files may be intuitive.

In some configurations, the CPU 11 of the receiver mobile terminal 10A may use the movement information about the receiver mobile terminal 10A, alone or in combination with the movement information about the sender mobile terminal 10B, to make the appropriate determinations in the merger process S346. For example, the movement information about the receiver mobile terminal 10A, alone or in combination with the movement information about the sender mobile terminal 10B, may be used to determine relative movement information about the sender mobile terminal 10B, which may be used in the merger process S346 in the same manner as the movement information in the particular sensor information described above.

Figure 5A:
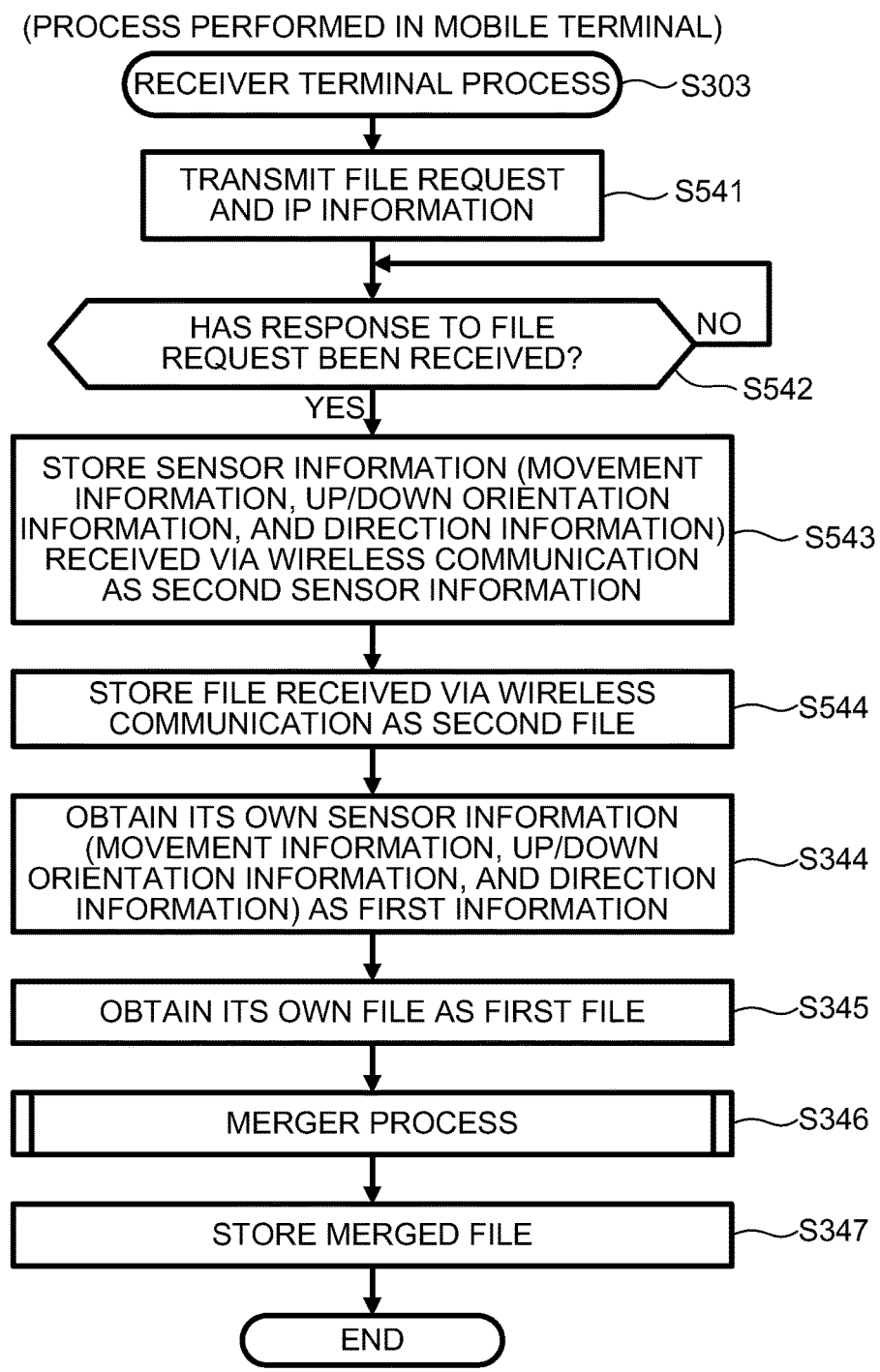
FIG. 5A is a flowchart showing an example receiver terminal process according to certain configurations.

Next, with reference to FIGS. 5A and 5B, certain configurations according to one or more aspects of the disclosure are described. In above-described configurations, the transmission and reception of the file may be performed between the two mobile terminals 10 (e.g., the mobile terminals 10A, 10B) via short-range communication. Alternatively, in certain configurations, the transmission and reception of the file may be performed between the two mobile terminals 10 (e.g., the mobile terminals 10A and 10B) via wireless communication using IP information. An explanation now is provided for the features of certain configurations that may differ from the features of the above-described configurations. An explanation of the features of certain configurations that may be substantially similar to the features of the above-described configurations is omitted, and such features may be referenced by the same reference characters described above.

With reference to FIG. 5A, a receiver terminal process (S303) now is described. The receiver mobile terminal process may be performed by the CPU 11 of the receiver mobile terminal 10A in accordance with the application 14c. The CPU 11 of the receiver mobile terminal 10A may transmit a file request and IP information of the receiver mobile terminal 10A to the other mobile terminal 10 (e.g., the sender mobile terminal 10B) via the short-range communication device 26 (S541). The file request may be ordered prior to the IP information, for example. The sender mobile terminal 10B may move closer to the receiver mobile terminal 10A subsequent to inputting the role of the mobile terminal 10 through the main screen (not shown) of the application 14c. As the distance between the mobile terminals 10A and 10B is reduced to the communicable distance of short-range communication or less, the file request and the IP information of the receiver mobile terminal 10A may be transmitted through short-range communication, in this order for example, to the sender mobile terminal 10B via the short-range communication device 26.

In S542, the CPU 11 of the receiver mobile terminal 10A may determine whether the receiver mobile terminal 10A has received a response to the file request from the sender mobile terminal 10B. When the CPU 11 of the receiver mobile terminal 10A determines that the receiver mobile terminal 10A has not received a response to the file request from the sender mobile terminal 10B via the short-range communication device 26 (NO in S542), the CPU 11 may repeat a determination in S542 until the receiver mobile terminal 10 receives a response to the file request via the short-range communication device 26. In S542, when the CPU 11 of the receiver mobile terminal 10A determines that the receiver mobile terminal 10 has received a response to the file request via the short-range communication device 26 (YES in S542), the CPU 11 may perform processing in S543 and S544 to receive the sensor information and a file from the sender mobile terminal 10B. In certain configurations, the transmission and reception of the sensor information and the file may be performed through wireless communication via the wireless LAN communication device 15.

In S543, the CPU 11 of the receiver mobile terminal 10A may store the sensor information of the sender mobile terminal 10B received through wireless communication via the wireless LAN communication device 15 in the sensor information storage area 13b, as particular sensor information (S543). In S544, the CPU 11 of the receiver mobile terminal 10A may store the file received through wireless communication via the wireless LAN communication device 15 (e.g., the file transmitted from the sender mobile terminal 10B) in the file storage area 13a, as a particular file (S544). In some configurations, the CPU 11 of the receiver mobile terminal 10A may perform the processing of S344 and S345, perform the merger process to merge the certain file and the particular file stored in the file storage area 13a (S346), and store the merged file in the memory card 20 (S347), similar to above-described embodiments, subsequent to S544. Subsequently, the CPU 11 of the receiver mobile terminal 10A may end the receiver mobile terminal process.

With reference to FIG. 5B, a sender terminal process (S302) according now described. The sender mobile terminal process may be performed by the CPU 11 of the sender mobile terminal 10B in accordance with the application 14c. In S521, the CPU 11 of the sender mobile terminal 10B may determine whether the sender mobile terminal 10B has received a file request from the receiver mobile terminal 10A (S521). When the CPU 11 of the sender mobile terminal 10B determines that the sender mobile terminal 10B has not received a file request from the receiver mobile terminal 10A via the short-range communication device 26 (NO in S521), the CPU 11 may repeat the determination in S521 until the sender mobile terminal 10B receives a file request via the short-range communication device 26. When the CPU 11 of the sender mobile terminal 10B determines that the sender mobile terminal 10B has received a file request via the short-range communication device 26 (YES in S521), the CPU 11 may receive IP information (e.g., IP information of the receiver mobile terminal 10A) via the short-range communication device 26 (S522). In S523, the CPU 11 of the sender mobile terminal 10B may transmit a response to the file request through wireless communication, via the wireless LAN communication device 15, to a receiver designated by the received IP information (S523). In S524, the CPU 11 of the sender mobile terminal 10B may transmit the sensor information from the sensors 23, 24, and 25 of the sender mobile terminal 10B through wireless communication, via the wireless LAN communication device 15, to the receiver designated by the received IP information (S524). In S525, the CPU 11 may transmit, through wireless communication via the wireless LAN communication device 15, the specified merge-target file from the memory card 20 to the receiver designated by the IP information (S525). Subsequently, the CPU 11 may end the receiver mobile terminal process.

According to certain configurations described above, and similar to other configurations described above, the files provided by the respective mobile terminals 10A and 10B may be readily merged. Further, the transmission and reception of the file may be performed via wireless communication. Therefore, a files of greater size may be transmitted and received more quickly than through short-range communication. Thus, wireless communication may offer additional convenience when a plurality of files are merged.

While the disclosure has been described in detail with reference to specific configurations, such configurations are merely examples, and various changes, arrangements, and modifications may be applied herein without departing from the spirit and scope of the disclosure.

For example, in above-described configurations, the mobile terminal 10 (e.g., the mobile terminals 10A and 10B) may comprise a telephone communication function. Nevertheless, in other configurations, for example, other devices, such as one or more of a tablet and a digital camera, which may not have the telephone communication function, may also be examples of the mobile terminal 10. Further, other devices that may not comprise a touch-sensitive screen 17, but may, for example, receive input commands through mechanical keys, may also be examples of the mobile terminal 10. In above-described configurations, the OS 14a may be the Android™ OS, for example. Nevertheless, in other configurations a mobile terminal 10 running another OS may also be used.

In above-described configurations, the mobile terminal 10 may comprise the LCD 18 on one surface, wherein the surface on which the LCD 18 may be disposed may be referred to as the reference surface and the other surface that may be opposite to the reference surface may be referred to as the rear surface (e.g., the rear surface 101a). In other configurations, for example, a mobile terminal 10 comprising the LCDs 18 on both surfaces thereof or having a complicated shape may be used. Consequently, a predetermined surface may be referred to as the reference surface and an opposite surface to the reference surface may be referred to as the rear surface. In above-described configurations, the mobile terminal 10 may comprise the LCD 18 on the one surface thereof and the reference surface may refer to the surface on which the LCD 18 may be disposed. Nevertheless, in other configurations, for example, a predetermined surface may be referred to as the reference surface in such a mobile terminal 10.

In above-described configurations, the up/down orientation of the mobile terminal 10 may be related to the direction of gravity Nevertheless, in other configurations, for example, the up/down orientation of a main body of the mobile terminal 10 may be predetermined. Consequently, the up/down orientation of one of the two mobile terminals 10 may be determined relative to the up/down orientation of the other mobile terminal determined with respect to the main body of the other mobile terminal. For example, the up/down orientation of the main body of the mobile terminal 10 may be determined with respect to the longitudinal direction of the surface on which the LCD 18 may be disposed, wherein the side on which the LCD 18 may be disposed may be defined as a top of the main body of the mobile terminal 10 and the side on which the operation key 16 may be disposed may be defined as the bottom of the main body of the mobile terminal 10. Thus, when the up/down orientation of the sender mobile terminal 10B is inverted with reference to the up/down orientation of the receiver mobile terminal 10A, each page of the particular file may be inverted. Accordingly, the relative up/down orientation of the mobile terminals 10 may be determined, and inverted when appropriate, even when the two mobile terminals 10 move closer to each other while their surfaces having the LCD 18 thereon are maintained in a horizontal position.

In above-described configurations, the receiver mobile terminal 10A may be configured to determine the file merge conditions (e.g., the file order, the page order of pages comprised in the received file, and the up/down orientation of the pages of each file) based on the sensor information (e.g., the particular sensor information) received from the sender mobile terminal 10B and the sensor information (e.g., the certain sensor information) detected by the sensors 23, 24, and 25 of the receiver mobile terminal 10A. Nevertheless, in other configurations, for example, the sender mobile terminal 10B may be configured to determine the file merge conditions. More specifically, the receiver mobile terminal 10A may transmit the sensor information detected by the sensors 23, 24, and 25 of the receiver mobile terminal 10A in conjunction with the file request and the IP information of the receiver mobile terminal 10A, through short-range communication via the short-range communication device 26, to the sender mobile terminal 10B. Subsequently, the sender mobile terminal 10B may determine the file merge conditions based on the sensor information received from the receiver mobile terminal 10A, the sensor information detected by the sensors 23, 24, and 25 of the sender mobile terminal 10B. Thereafter, the sender mobile terminal 10B may transmit the determined file merge conditions via wireless communication to the receiver mobile terminal 10A designated by the IP information received by the sender mobile terminal 10B.

In above-described configurations, the receiver mobile terminal 10A may be configured to invert the up/down orientation of the pages of the file provided by the sender mobile terminal 10B when appropriate, based on the up/down orientation information received from the sender mobile terminal 10B. Nevertheless, in other configurations, for example, the sender mobile terminal 10B may be configured to invert the up/down orientation of the pages of the file prior to the transmission of the file to the receiver mobile terminal 10A, based on the up/down orientation information obtained by the sender mobile terminal 10B itself, when the sender mobile terminal 10B is in the upside-down orientation. Subsequently, the sender mobile terminal 10B may transmit the inverted file to the receiver mobile terminal 10A. Consequently, in some configurations, for example, the sender mobile terminal 10B may not be configured to allow the transmission of the up/down orientation information to the receiver mobile terminal 10A. Thus, the sensor information that the sender mobile terminal 10B may transmit may comprise the direction information and the movement information without the up/down information.

In above-described configurations, the receiver mobile terminal 10A may be configured to determine the moving direction of the other mobile terminal (e.g., the sender mobile terminal 10B) based on the movement information received from the sender mobile terminal 10B in S408, S409, and S412 of the merger process in FIG. 4. Thereafter, the receiver mobile terminal 10A may compare, in S410, the determined moving direction of the sender mobile terminal 10B and its own facing direction (e.g., the receiver mobile terminal 10A). Nevertheless, in other configurations, for example, the receiver mobile terminal 10A may be configured to determine the moving direction of the receiver mobile terminal 10A based on the movement information of the receiver mobile terminal 10A and compare the determined moving direction of the receiver mobile terminal 10A and the facing direction of the sender mobile terminal 10B represented by the direction information received from the sender mobile terminal 10B. Thus, the files may be merged by based on movement of the receiver mobile terminal 10A closer to the sender mobile terminal 10B.

In certain configurations described above, the receiver mobile terminal 10A may be configured to obtain its own sensor information at the time of performing wireless communication with the sender mobile terminal 10B (e.g., at the time of S344). Nevertheless, in other configurations, for example, the receiver mobile terminal 10A may be configured to obtain its own sensor information at the time of performing short-range communication with the sender mobile terminal 10B (e.g., prior or subsequent to S541).

In above-described configurations, the two merge-target files may be in the same format. Nevertheless, in other configurations, for example, the two merge-target files may be in respective different formats. Consequently, the mobile terminal 10 may be configured to convert the file format. In above-described configurations, the merge-target files provided by the receiver mobile terminal 10A and the sender mobile terminal may be stored in the memory card 20. Nevertheless, in other configurations, for example, the merge-target files may be stored in a memory built into the mobile terminal 10, such as the flash memory 14. Further, the values referred to in above-described configurations may be merely examples. As a matter of course, other values may be adopted thereto.

While the invention has been described in connection with various exemplary structures and illustrative configurations, it will be understood by those skilled in the art that other variations and modifications of the structures, configurations, and configurations disclosed above may be made without departing from the scope of the invention. For example, this application comprises each and every possible combination of the various elements and features disclosed herein, and the particular elements and features presented in the claims and disclosed above may be combined with each other in other ways within the scope of the application, such that the application should be recognized as also directed to other configurations comprising other possible combinations. Other structures, configurations, and configurations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A computer-readable storage medium storing computer-readable instructions therein, the computer-readable instructions, when executed by an information processing device comprising a sensor, a reference surface, a rear surface opposite the reference surface, and a storage device, instructing the information processing device to perform steps comprising:
   receiving a particular file and particular sensor information from a terminal device, wherein the terminal device comprises a reference surface and a rear surface opposite the reference surface, the particular sensor information generated by the terminal device;
   accessing further sensor information, the further sensor information generated by the sensor of the information processing device;
   determining a merge condition based on the particular sensor information and the further sensor information;
   merging a further file stored in the storage device and the particular file into a single file, wherein the further file comprises at least one page and the particular file comprises a plurality of pages, and wherein the order of the pages of the further file and the particular file in the single file is based on the merge condition;
   determining a facing direction of the terminal device and a facing direction of the information processing device based on the particular sensor information and the further sensor information, wherein the facing direction corresponds to a direction of a vector normal to the reference surface and extending toward the rear surface from the reference surface; and
   changing the merge condition in accordance with relative facing directions of the terminal device and the information processing device.

2. The computer-readable storage medium according to claim 1, wherein the step of receiving the particular file and the particular sensor information comprises:
   receiving, via a short-range communication device using short-range communication, the particular file and the particular sensor information from the terminal device when a distance between the information processing device and the terminal device is less than or equal to a predetermined distance, the short-range communication device configured to perform the short-range communication over the predetermined distance.

3. The computer-readable storage medium according to claim 1,
   wherein the computer-readable instructions further instruct the information processing device to perform steps comprising:
      transmitting, via a short-range communication device using short-range communication, certain identifying information to the terminal device when a distance between the information processing device and the terminal device is less than or equal to a predetermined distance, the certain identifying information identifying the information processing device, and the short-range communication device configured to perform the short-range communication over the predetermined distance, and
   wherein the step of receiving the particular file and the particular sensor information comprises:
      receiving, via a wireless communication device using wireless communication, the particular file and the particular sensor information from the terminal device subsequent to the step of transmitting the certain identifying information to the terminal device.

4. The computer-readable storage medium according to claim 3, wherein the computer-readable instructions further instruct the information processing device to perform steps comprising:
   determining whether the information processing device is operating as one of a sender device and receiver device;
   receiving, via the short-range communication, particular identifying information from the terminal device, the particular identifying information identifying the terminal device; and
   transmitting, via the wireless communication, the further file to the terminal device based on the particular identifying information in response to determining that the information processing device is operating as the sender device.

5. The computer-readable storage medium according to claim 1,
   wherein the computer-readable instructions further instruct the information processing device to perform steps comprising:
      determining whether a reference surface of the information processing device is disposed closer to the terminal device than another surface of the information processing device based on the particular sensor information and the further sensor information, the other surface of the information processing device being on an opposite side of the information processing device from the reference surface, and wherein the step of determining the merge condition comprises:
determining the merge condition to indicate that the particular file is to be placed prior to the further file during the step of merging the further file and the particular file in response to determining that the reference surface of the information processing device is disposed closer to the terminal device than the other surface of the information processing device.

6. The computer-readable storage medium according to claim 1,
wherein the computer-readable instructions further instruct the information processing device to perform steps comprising:
determining whether a reference surface of the information processing device is disposed farther from the terminal device than another surface of the information processing device based on the particular sensor information and the further sensor information, the other surface of the information processing device being on an opposite side of the information processing device from the reference surface, and
wherein the step of determining the merge condition comprises:
determining the merge condition to indicate that the further file is to be placed prior to the particular file during the step of merging the further file and the particular file in response to determining that the reference surface of the information processing device is disposed farther from the terminal device than the other surface of the information processing device.

7. The computer-readable storage medium according to claim 6, wherein the step of determining the merge condition further comprises:
determining the merge condition to indicate that the particular file is to be placed prior to the further file during the step of merging the further file and the particular file in response to determining that the reference surface of the information processing device is not disposed farther from the terminal device than the other surface of the information processing device.

8. The computer-readable storage medium according to claim 1,
wherein the computer-readable instructions further instruct the information processing device to perform steps comprising:
determining whether an operational orientation of the terminal device is a substantially normal orientation based on the particular sensor information; and
changing a page orientation of at least one page of the particular file into a particular orientation in response to determining that the operational orientation of the terminal device is not the substantially normal orientation, and
wherein the step of determining the merge condition comprises:
determining the merge condition to indicate that the at least one page of the particular file, which is changed to the particular orientation, is to be merged with at least one page of the further file during the step of merging the further file and the particular file in response to determining that the operational orientation of the terminal device is not the substantially normal orientation; and
determining the merge condition to indicate that the at least one page of the particular file, which is not changed to the particular orientation, is to be merged with the at least one page of the further file during the step of merging the further file and the particular file in response to determining that the operational orientation of the terminal device is the substantially normal orientation.

9. The computer-readable storage medium according to claim 8,
wherein the computer-readable instructions further instruct the information processing device to perform steps comprising:
determining whether the operational orientation of the terminal device is a substantially sideways orientation based on the particular sensor information; and
changing the page orientation of the at least one page of the particular file into a further orientation in response to determining that the operational orientation of the terminal device is the substantially sideways orientation, and
wherein the step of determining the merge condition comprises:
determining the merge condition to indicate that the at least one page of the particular file, which is changed to the further orientation, is to be merged with the at least one page of the further file during the step of merging the further file and the particular file in response to determining that the operational orientation of the terminal device is the substantially sideways orientation; and
determining the merge condition to indicate that the at least one page of the particular file, which is not changed to the further orientation, is to be merged with the at least one page of the further file during the step of merging the further file and the particular file in response to determining that the operational orientation of the terminal device is not the substantially sideways orientation.

10. The computer-readable storage medium according to claim 1,
wherein the computer-readable instructions further instruct the information processing device to perform steps comprising:
determining whether an operational orientation of the information processing device is a substantially normal orientation based on the further sensor information; and
changing a page orientation of at least one page of the further file into a particular orientation in response to determining that the operational orientation of the information processing device is not the substantially normal orientation, and
wherein the step of determining the merge condition comprises:
determining the merge condition to indicate that the at least one page of the further file, which is changed to the particular orientation, is to be merged with at least one page of the particular file during the step of merging the further file and the particular file in response to determining that the operational orientation of the information processing device is not the substantially normal orientation; and
determining the merge condition to indicate that the at least one page of the further file, which is not changed to the particular orientation, is to be merged with the at least one page of the particular file during the step of merging the further file and the particular file in response to determining that the operational orientation of the information processing device is the substantially normal orientation.

11. The computer-readable storage medium according to claim 10,
wherein the computer-readable instructions further instruct the information processing device to perform steps comprising:
determining whether the operational orientation of the information processing device is a substantially sideways orientation based on the particular sensor information; and
changing the page orientation of the at least one page of the particular file into a further orientation in response to determining that the operational orientation of the information processing device is the substantially sideways orientation, and
wherein the step of determining the merge condition comprises:
determining the merge condition to indicate that the at least one page of the particular file, which is changed to the further orientation, is to be merged with the at least one page of the further file during the step of merging the further file and the particular file in response to determining that the operational orientation of the information processing device is the substantially sideways orientation; and
determining the merge condition to indicate that the at least one page of the particular file, which is not changed to the further orientation, is to be merged with the at least one page of the further file during the step of merging the further file and the particular file in response to determining that the operational orientation of the information processing device is not the substantially sideways orientation.

12. The computer-readable storage medium according to claim 1, wherein the computer-readable instructions further instruct the information processing device to perform steps comprising:
determining whether the information processing device is operating as one of a sender device and receiver device; and
transmitting the further file and the further sensor information to the terminal device in response to determining that the information processing device is operating as the sender device.

13. The computer-readable storage medium according to claim 1, wherein changing the merge condition includes changing the merge sequential order.

14. A computer-readable storage medium storing computer-readable instructions therein, the computer-readable instructions, when executed by an information processing device comprising a sensor and a storage device, instructing the information processing device to perform steps comprising:
receiving a particular file and particular sensor information from a terminal device, the particular sensor information generated by the terminal device;
accessing further sensor information, the further sensor information generated by the sensor of the information processing device;
determining a merge condition based on the particular sensor information and the further sensor information; and
merging a further file stored in the storage device and the particular file into a single file, wherein content of the further file and content of the particular file is arranged based on the merge condition,
wherein the computer-readable instructions further instruct the information processing device to perform steps comprising:
determining whether a facing direction of the terminal device is substantially the same as a facing direction of the information processing device based on the particular sensor information and the further sensor information; and
sorting pages of the particular file into a reverse order in response to determining that the facing direction of the particular terminal device is not substantially the same as the facing direction of the information processing device when the particular file comprises a plurality of pages, and
wherein the step of determining the merge condition comprises:
determining the merge condition to indicate that the pages of the particular file, which are sorted in the reverse order, are to be merged with at least one page of the further file during the step of merging the further file and the particular file when the information processing device has performed the step of sorting the pages of the particular file; and
determining the merge condition to indicate that the pages of the particular file, which are not sorted in the reverse order, are to be merged with at least one page of the further file during the step of merging the further file and the particular file when the information processing device has determined that the facing direction of the particular terminal device is substantially the same as the facing direction of the information processing device.

15. The computer-readable storage medium according to claim 14, wherein the step of determining the merge condition further comprises:
determining the merge condition to indicate that one page of the particular file, which is not sorted, is to be merged with at least one page of the further file during the step of merging the further file and the particular file when the particular file does not comprise a plurality of pages.

16. An information processing device, comprising:
a sensor configured to generate certain sensor information;
a storage device configured to store a certain file;
a communication device comprises a reference surface and a rear surface opposite the reference surface, and wherein the communication device is configured to communicate with a terminal device, wherein the terminal device comprises a reference surface and a rear surface opposite the reference surface;
a processor; and
a memory storing computer-readable instructions therein, the computer-readable instructions, when executed by the processor, instructing the information processing device to perform steps comprising:
receiving, via the communication device, a particular file and particular sensor information from the terminal device, the particular sensor information generated by the terminal device;
accessing the certain sensor information;
determining a merge condition based on the particular sensor information and the certain sensor information;

merging the certain file and the particular file into a single file, wherein the certain file comprises at least one page and the particular file comprises a plurality of pages, and wherein the order of the pages of the certain file and the particular file in the single file is based on the merge condition;

determining a facing direction of the terminal device and a facing direction of the communication device based on the particular sensor information and the certain sensor information, wherein the facing direction corresponds to a direction of a vector normal to the reference surface and extending toward the rear surface from the reference surface; and changing the merge condition in accordance with relative facing directions of the terminal device and the communication device.

17. The information processing device according to claim 16, wherein changing the merge condition includes changing the merge sequential order.

\* \* \* \* \*